United States Patent [19]

Rathgeber

[11] Patent Number: 4,492,953

[45] Date of Patent: Jan. 8, 1985

[54] METHOD AND APPARATUS FOR CODING PULSE-AMPLITUDE MODULATED SIGNALS INTO PULSE-CODE MODULATED SIGNALS IN ACCORDANCE WITH AN APPROXIMATED LOGARITHMIC CHARACTERISTIC CURVE

[75] Inventor: Max Rathgeber, Taufkirchen, Fed. Rep. of Germany

[73] Assignee: Siemens Aktiengesellschaft, Berlin & Munich, Fed. Rep. of Germany

[21] Appl. No.: 383,978

[22] Filed: Jun. 1, 1982

[30] Foreign Application Priority Data

Jul. 13, 1981 [DE] Fed. Rep. of Germany ....... 3127600

[51] Int. Cl.³ ............................................. H03K 13/02
[52] U.S. Cl. ........................ 340/347 AD; 340/347 M; 375/25
[58] Field of Search ....... 340/347 AD, 347 M, 347 C; 375/25

[56] References Cited

FOREIGN PATENT DOCUMENTS 1762846 9/1970 Fed. Rep. of Germany .

*Primary Examiner*—T. J. Sloyan
*Attorney, Agent, or Firm*—Hill, Van Santen, Steadman & Simpson

[57] ABSTRACT

A process, and a device for carrying out the process, is provided for coding pulse-amplitude modulated signals into PCM signals in accordance with an approximated logarithmic characteristic curve. In the process, a partial coding characteristic curve which possesses a substantially reduced dynamic scope is first produced in a known manner. In accordance with the invention, a second pre-decision is carried out which subdivides the dynamic region of the partial coding characteristic curve into two sub-regions in such a manner that the coding of the lower and upper sub-regions is effected with the same number of weighting steps. This saves one weighting step with respect to prior processes.

8 Claims, 4 Drawing Figures

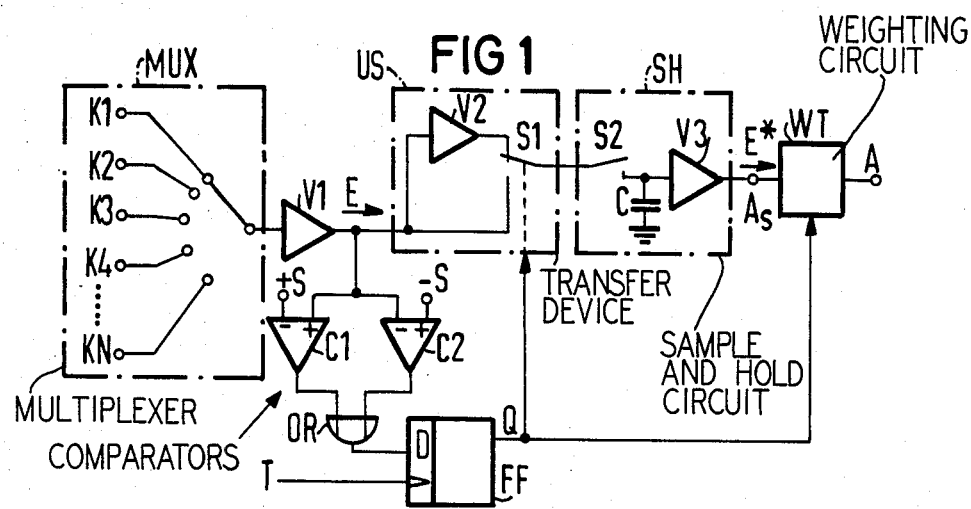
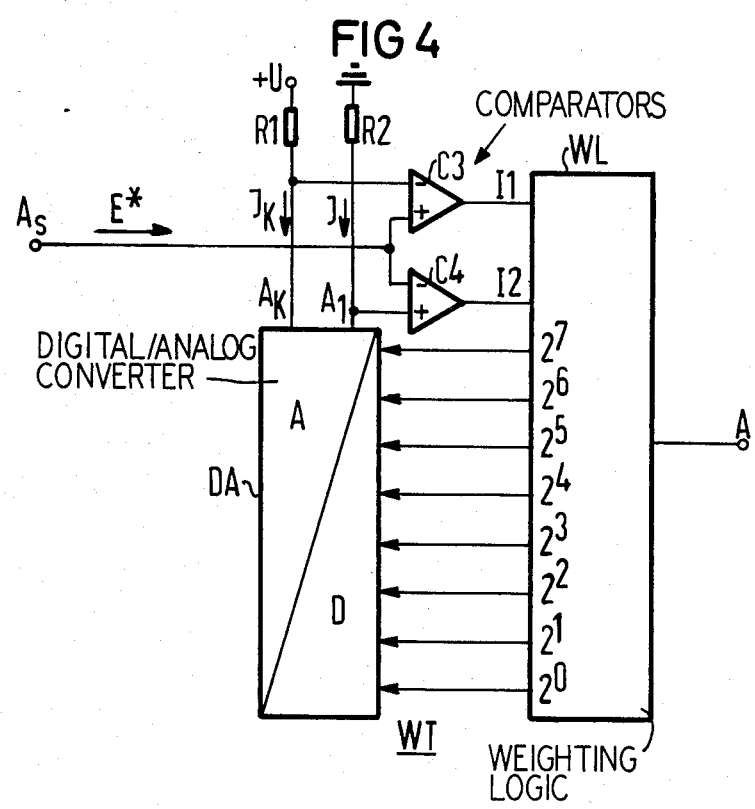

METHOD AND APPARATUS FOR CODING PULSE-AMPLITUDE MODULATED SIGNALS INTO PULSE-CODE MODULATED SIGNALS IN ACCORDANCE WITH AN APPROXIMATED LOGARITHMIC CHARACTERISTIC CURVE

BACKGROUND OF THE INVENTION

1. Field of the Invention

The present invention relates to a method and to an apparatus for coding pulse-amplitude modulated signals into pulse-code modulated signals in accordance with an approximated logarithmic coding characteristic curve, whose dynamic region is sub-divided into a plurality of segments with a coding which is linear in itself. The method includes a pre-decision operation which is dependent upon the amplitude of the input signal and which subjects below or above a specified threshold to an amplitude transformation. The process converts all input values, which have been compressed in such a manner, in accordance with a partial coding characteristic curve obtained from the coding characteristic curve by the same amplitude transformation.

2. Description of the Prior Art

In order to reduce the data rate, it is known in the conversion of pulse-amplitude modulated signals to carry out a compression by an approximated logarithmic characteristic curve. In practice, a so-called 13-segment coding characteristic curve (CCITT) has prevailed on the market. In this characteristic curve, the entire region for positive and negative amplitudes is divided into 13 linear segments. With these sections, which have different inclinations, the amplitudes are again linearly coded. The German allowed and published application No. 17 62 846 fully incorporated herein by this reference, discloses a process and a device for coding pulse-amplitude modulated signals into pulse code modulated (PCM) signals. In this process, the input signal is sub-divided into two or more amplitude segments. By multiplication of the small input signals, identical coding characteristic curves are produced over at least one segment, so that the dynamic scope is limited and a simpler coding arrangement results. As the coding device is often used in multiplex operation, high requirements are placed on the speed of processing.

SUMMARY OF THE OPERATION

The object of the present invention is to provide a coding process, an apparatus for carrying out the process, for re-coding amplitude-modulated signals into PCM signals in accordance with an approximated logarithmic characteristic curve, and in which the coding process requires less coding steps.

Beginning from the prior art set forth above, and in accordance with the invention, the above object is realized in that, in the case of the partial coding characteristic curve, a second pre-decision at a second threshold value is provided, the second pre-decision sub-dividing the dynamic region of the partial coding characteristic into two sub-regions in such a manner that the coding of the lower sub-region and the upper sub-region is effected with the same number of weighting steps.

In this process it is advantageous that one exact coding step less is required. The second pre-decision can be performed by the actual coding portion, the weighting portion.

It is advantageous that on surpassing the threshold value of the second pre-decision stage, the sign in a weighting portion is first ascertained and the exact value is subsequently coded, and that on surpassing a threshold value during the pre-decision, the sign is simultaneously coded and subsequently, the exact value.

On surpassing the second threshold value the sign is first determined. The determination is effected by the weighting portion in that the value zero is applied to a comparison device. The coding of the applied signal is subsequently performed. If, however, the second threshold has been exceeded in terms of amplitude, the sign is determined at the same time. Subsequently, the coding operation takes place in a known manner. For this purpose, the decision thresholds which correspond to the break points of the partial coding characteristic curve are applied. This process is repeated until the corresponding segment is determined. Thereafter, the coding within a segment is carried out.

It is particularly advantageous that the threshold of the second pre-decision stage lies approximately in the center of the particular segment of the partial coding characteristic curve.

In this threshold arrangement, the comparators need not be designed in a particularly exact fashion. Moreover, a decision can be performed shortly before the application of the signal to be coded. As the thresholds are subject to tolerances, the exact coding within a segment must be ensured in spite of an erroneous pre-decision in the threshold analysis. Therefore, an overlap region is formed around the threshold values for the coding operation.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a basic circuit diagram of a coding arrangement constructed in accordance with the present invention;

FIG. 4 illustrates the weighting circuit.

DESCRIPTION OF THE PREFERRED EMBODIMENTS

The coding arrangement illustrated in FIG. 1 comprises a multiplexer MUX having a plurality of inputs which are connected to a plurality of low-frequency channels K1-Kn. The output of the multiplexer MUX is connected to the input of an input amplifier V1. Two comparators C1 and C2 are connected to the output of an input amplifier V1. A positive threshold value +S is connected to the inverting second input of the first comparator C1, and a negative threshold −S is connected to the second non-inverting input of the second comparator C2. The outputs of the comparators are coupled by an OR gate OR. This can also be a "wired OR" connection. The output of the OR gate OR is connected to the D input of a flip-flop FF whose output Q operates a transfer device US including a switch S1 which is directly connected to the output of the input amplifier V1 and, in the case of small amplitudes of the input signal, via a second amplifier V2 to the output of the input amplifier V1. The output of the switch S1 is connected to a sample and hold circuit SH. The latter is a sampling circuit which comprises, in a known manner, a switch S2, a capacitor C connected to ground and a third amplifier V3 for decoupling. A weighting circuit WT, having an output A, is connected to the output of the sample and hold circuit SH. The multiplexer, the D flip-flop FF, the sample and hold circuit SH and the weighting circuit WT are controlled by a central pulse unit (not illustrated). Only in the D flip-flop FF is the central pulse unit indicated by a pulse input T. The output of the D flip-flop FF is connected to the weighting circuit WT.

A random amplitude value, e.g. of the low-frequency channel K1, is fed to the two comparators C1 and C2 by way of the multiplexer MUX and the input amplifier V1. If the amplitude surpasses one of the two threshold values $+S$ or $-S$ the transfer device US is operated via the OR gate OR and the D flip-flop FF and the amplification of the transfer device is switched over. Therefore, the sample and hold circuit SH is offered a signal, which is reduced in dynamic condition, whereby the subsequent weighting circuit is simplified.

Figure 2:
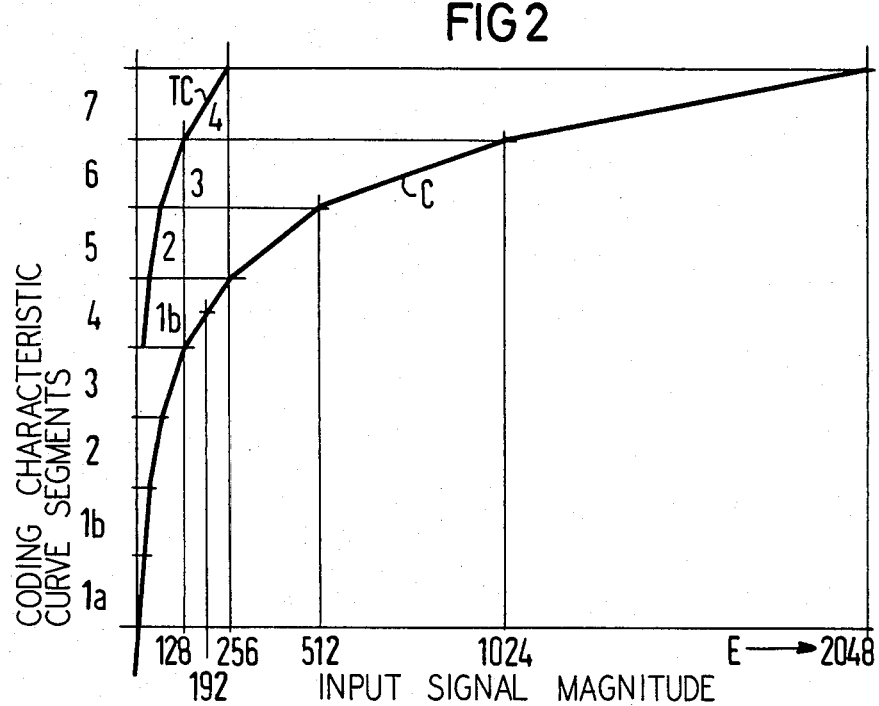
FIG. 2 is a graphic illustration of the positive portion of the coding characteristic curve.

The operation of the transfer device US will be explained with reference to FIG. 2. FIG. 2 ilustrates the positive portion of the coding characteristic curve C. The maximum amplitude of the input signal E, which is illustrated as the abscissa, amounts to the 2048 multiple of the smallest amplitude step which can be coded. The segments $1a$, $1b$ and 2–7 are illustrated as the ordinate. In this exemplary embodiment, the thresholds amount to approximately the 192 multiple of the smallest amplitude step which can be coded. Below these threshold values, the small signals are amplified or the large signals are attenuated. The latter case is illustrated in FIG. 2, the attenuation factor being 8:1 in the 13-segment characteristic curve. The original segments 4–7 are hereby transferred into segments $1b$–4 of a partial coding characteristic curve TC. The decision of the first two comparators C1 and C2 is obviously taken into consideration when coding the PCM signal. However, the weighting circuit WT only has to consider the partial coding characteristic curve TC, which is again illustrated in FIG. 3. Therefore, the amplitude range of the input signal E* for the weighting circuit WT has been reduced from the 2048 multiple to the 256 multiple (for positive and negative input signals, respectively) of the smallest amplitude step which can be coded.

Figure 3:
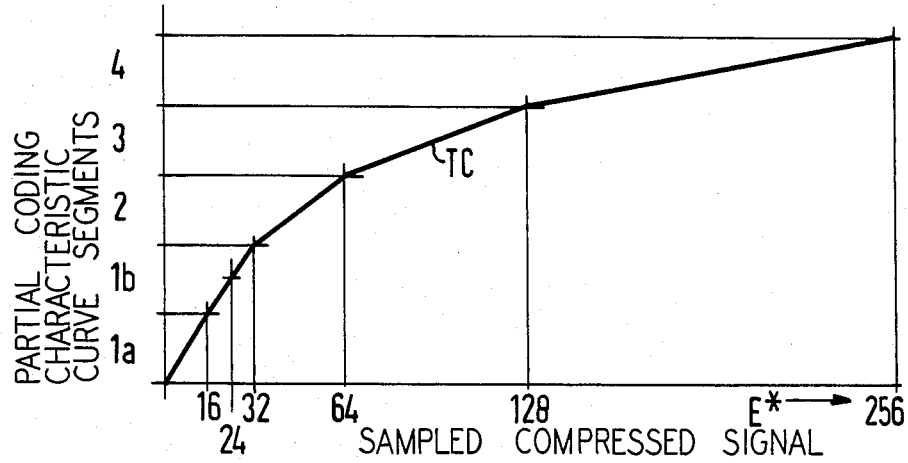
FIG. 3 illustrates the partial coding characteristic curve.

In accordance with the invention, the partial coding characteristic curve TC is divided into two sub-regions (FIG. 3). In the 13-segment characteristic curve, the threshold value for dividing the partial coding characteristic curve lies at approximately 24/256 of the maximum amplitude of the input signal E* of the weighting circuit. Therefore, the coding of the sub-regions can be effected with the same number of steps.

The operation will be explained with reference to the weighting circuit in FIG. 4. The weighting circuit essentially contains the weighting logic WL, a digital-/analog converter DA and a further pair of comparators C3, C4 whose outputs are respectively connected to an input I1, I2 of the weighting logic WL. The non-inverting input of the third comparator C3 and the inverting input of the forth comparator C4 are coupled and connected to the output $A_s$ of the sample and hold circuit SH. The inverting input of the third comparator K3 is connected to the output $A_k$ of the digital/analog converter DA and is simultaneously connected via a resistor R to the positive reference potential $+U$ corresponding to the positive maximum value of the input signal E* of the weighting circuit. The non-inverting input of the fourth comparator C4 is connected to the output $A_l$ of the digital/analog converter DA and simultaneously to the resistor R2 whose second terminal is connected to ground. The digital/analog converter is a commercial component, e.g. type DAC-08 manufactured by Bourns, Columbia Avenue, Riverside CA. The digital/analog converter supplies the currents I and $I_k$ at its outputs $A_l$ and $A_k$. The outputs of the comparators C3 and C4 are connected to inputs of the weighting logic WL. The weighting logic WL, for its part, controls the digital/analog converter DA by means of its outputs which are designated $2^0$–$2^7$.

The currents generated by the digital/analog converter DA are negative, i.e. directed into the module. The current $I_k$ is complementary to the current I, thus supplementing the same to form a current of constant magnitude. By means of the connection of the resistors R1 and R2 to different potentials, the thresholds of the third and fourth comparators are so controlled that they are always lie symmetrically to 0 volt.

When scanning an analog signal at the input of the coding arrangement, the decision thresholds for the third and fourth comparators are adjusted, in the present case $\pm 24$, by means of the weighting logic WL and the digital/analog coverter DA. If the output signal E* of the weighting circuit which is connected to the output of the sample and hold circuit SH is, for example, positive and larger than the given threshold value, the third comparator C3 responds. Therefore, the sign is determined and the further coding operation is effected by the weighting logic WL in that $\pm 64$ is first applied as the next further decision threshold. If this value is undershot, then $\pm 32$ is connected as the next threshold, and if the threshold of 64 is overshot, then $\pm 128$ is connected as the next threshold, whereby the segment which is finally to be coded is determined and the further coding operation within the segment is subsequently carried out by means of four further weighting steps because each segment is divided into 16 further portions.

If, however, an input signal E* which is smaller than the second threshold is connected to the inputs of the third and fourth comparators, the sign, namely positive and negative input voltage, is ascertained in that 0 volt is supplied to both comparators C3, C4 as a comparison value by the digital/analog converter DA. In this case, the current I=0 and the complementary current $I_k$ is a maximum. Only a comparator, whereby the sign is ascertained, will respond. By means of the digital/analog converter, different comparison values are subsequently applied to the comparators in a known manner. As the segments $1a$ and $1b$ which contain more than 16 coding steps are to be coded, five further weighting steps are required.

The coding operation is again effected in that the largest possible individual weight of the digital/analog converter is first used as a comparison value. If it is too large, the next smaller individual weight is used; if it is too small, the next smaller individual weight is used; and if it is too small, the next smaller individual weight is added, and so forth.

The insertion of further pre-decision thresholds permits the economy of a further exact weighting step.

Although I have described my invention by reference to particular illustrative embodiments thereof, may changes and modifications of the invention may become apparent to those skilled in the art without departing from the spirit and scope of the invention. I therefore intend to include within the patent warranted hereon, all such changes and modifications as may reasonably and properly be included within the scope of my contribution to the art.

I claim:

1. In a process for coding pulse amplitude modulated signals into pulse code modulated signals, in accordance with an approximated logarithmic coding characteristic curve having a dynamic region which is sub-divided into a plurality of segments each having linear coding, in which process a first pre-decision is performed which is dependent upon the amplitude of an input signal of a maximum value $E = \pm 2048$ and subjects signals above or below a first threshold value to an amplitude transmission, the improvement therein comprising the step of:

given a thirteen segment characteristic, setting the first threshold value for positive and negative values between 128/2048 and 256/2048 of the maximum input signal $E = \pm 2048$ and selecting a partial coding characteristic curve from the characteristic curve having companded input values $E^*$;

amplifying input signals of less than the first threshold value by the factor 8; setting a second pre-decision at a second threshold value of between 16/256 and 32/256 of the maximum companded input value $E^* = \pm 256$ to divide the dynamic region of the partial coding characteristic curve into upper and lower subregions; and weighting the amplitude transformed signals falling into the upper and lower subregions with the same number of weighting steps to code the signals.

2. The improved process of claim 1, and further defined by:

first detecting the sign of a signal which overshoots the second threshold value; and then coding the value of the signal.

3. The improved process of claim 1, wherein the step of setting the second pre-decision is further defined as:

setting the second threshold value at approximately the center of the respective segment of the partial coding characteristic curve.

4. The improved process of claim 1, wherein there is a maximum input amplitude and a thirteen segment coding characteristic curve is employed, and further defined by the steps of:

setting the first threshold at $\pm 192/2048$ of the maximum input amplitude; setting the second threshold value at approximately $\pm 24/256$ of the maximum value of the partial coding characteristic curve.

5. The improved process of claim 4, comprising the further step of:

multiplexing a plurality of channels to provide the input signals.

6. An arrangement for coding pulse amplitude modulated signals into pulse code modulated signals, comprising:

an input, first amplifier for receiving amplitude modulated input signals;

first and second comparators each connected to said input amplifier and to first and second oppositely poled reference voltages;

a flip-flop connected to be operated by either of said first and second comparators in response to an input signal below said reference voltages;

a transfer circuit including a second amplifier connected to said first amplifier, a shunt about said second amplifier, and a switch connected to said second amplifier and said shunt and connected to and controlled by said flip-flop to through-connect said second amplifier in response to input signals from said first amplifier below said reference voltages and to through-connect said shunt in response to input signals from said first amplifier above said reference voltages;

sampling means connected to said switch and operable to sample through-connected signals; and weighting means including third and fourth comparators each connected to said sampling means, a weighting logic circuit connected to said third and fourth comparators and operable to provide weighting factor signals in response to signals received from said third and fourth comparators, and a digital/analog converter connected between said weighting logic circuit and said third and fourth comparators for producing reference voltages for said third and fourth comparators.

7. The arrangement according to claim 6, and further comprising:

first and second resistors of the same value, said first resistor connected between a first voltage and the junction of said digital/analog converter and the inverting input of said third comparator, and said second resistor connected between a second voltage and the junction of said digital/analog converter and the non-inverting input of said fourth comparator.

8. The arrangement according to claim 7, wherein: said first and second resistors are of the same value.

* * * * *